(12) United States Patent
Soehnge et al.

(10) Patent No.: US 11,067,161 B2
(45) Date of Patent: Jul. 20, 2021

(54) TRANSMISSION WITH A SEPARATE BREATHER ELEMENT

(71) Applicant: GETRAG FORD TRANSMISSIONS GMBH, Köln (DE)

(72) Inventors: Patrick Soehnge, Wuppertal (DE); Stephan Scheve, Troisdorf (DE); Patric Lau, Vettweiss-Kelz (DE); Frank Pricken, Krefeld (DE)

(73) Assignee: Getrag Ford Transmissions GmbH, Cologne (DE)

( * ) Notice: Subject to any disclaimer, the term of this patent is extended or adjusted under 35 U.S.C. 154(b) by 0 days.

(21) Appl. No.: 16/763,040

(22) PCT Filed: Nov. 27, 2018

(86) PCT No.: PCT/EP2018/082672
§ 371 (c)(1),
(2) Date: May 11, 2020

(87) PCT Pub. No.: WO2019/105918
PCT Pub. Date: Jun. 6, 2019

(65) Prior Publication Data
US 2020/0278021 A1 Sep. 3, 2020

(30) Foreign Application Priority Data

Nov. 30, 2017 (DE) .......................... 102017128417.6

(51) Int. Cl.
*F16H 57/027* (2012.01)
(52) U.S. Cl.
CPC .................................. *F16H 57/027* (2013.01)

(58) Field of Classification Search
CPC .......... F16K 24/00; F16K 24/04; F16K 24/06; F16H 57/02; F16H 57/027; F16H 57/0415; F16H 57/0416
See application file for complete search history.

(56) References Cited

U.S. PATENT DOCUMENTS

| | | | |
|---|---|---|---|
| 2008/0156374 A1* | 7/2008 | Nakano | F16H 57/027 137/14 |
| 2019/0085967 A1* | 3/2019 | Morita | F02D 41/086 |
| 2020/0191253 A1* | 6/2020 | Zwerger | F16H 57/0473 |

FOREIGN PATENT DOCUMENTS

| | | |
|---|---|---|
| DE | 102014215203 A1 | 2/2016 |
| EP | 1516765 A2 | 3/2005 |
| EP | 2287031 A1 | 2/2011 |
| JP | S58-167377 U | 11/1983 |
| JP | S62-112357 U | 7/1987 |

* cited by examiner

Primary Examiner — Prasad V Gokhale
(74) Attorney, Agent, or Firm — Richard M. Goldberg

(57) ABSTRACT

A transmission for a motor vehicle, includes a housing (1), which has a first housing part (10) and a second housing part (20), wherein, in the assembled state of the transmission, the first housing part (10) and the second housing part (20) are joined together, having a vent duct (30), through which air can escape from the transmission, and having a separate breather element (31), which extends into the first housing part (10) and forms at least one first duct wall of the vent duct (30), and the breather element (31) is located in a plug-in position in the first housing half (10) and has a fixing stop (37), against which the second housing part (20) bears in the assembled state of the transmission and thus securely fixes the breather element (31) in the plug-in position.

7 Claims, 7 Drawing Sheets

TRANSMISSION WITH A SEPARATE BREATHER ELEMENT

BACKGROUND OF THE INVENTION

The invention relates to a transmission for a motor vehicle, which has a housing and a vent duct, through which air can escape from an interior of the transmission enclosed by the housing.

DE 10 2014 215 203 A1 discloses a breather element for a vehicle transmission that forms the vent duct or at least a first duct wall of the vent duct. The vehicle transmission has a first housing part and a second housing part, wherein, in the assembled state of the transmission, the first housing part and the second housing part bear against one another and are fixedly joined together. The separate breather element has a holding device in order to fix the breather element to the first housing part. The fixing of the breather element to the first housing part requires a separate assembly step, which makes the assembly of the transmission more expensive.

By the separate breather element, which extends from the first housing part via a dividing line between the housing parts into the second housing part of the transmission, the vent duct or parts of it can be realized in a cost-effective manner. The vent duct is necessary in order to make it possible for air to escape if, for example, an increase in pressure in the transmission results from an increase in temperature. In this case, the vent duct should be created so that only air can escape from the transmission. The escape of oil or small drops of oil should be avoided in this case.

Although the separate breather element can be used to implement a vent duct in a simple manner, through which essentially only air can escape from the transmission, there is a need to provide a transmission for a motor vehicle that has a vent duct, is simply constructed, and can be produced simply and inexpensively.

SUMMARY OF THE INVENTION

The object of the invention is achieved with the combination of features according to the independent claim. Exemplary embodiments of the invention can be found in the dependent claims.

According to the invention, it is provided that the breather element is in a plug-in position in the first housing half and has a fixing stop, against which, in the assembled state of the transmission, the second housing part bears and thus securely fixes the breather element in the plug-in position. It is therefore not necessary to fix the separate breather element to the first housing part in a separate assembly step, for example by using screws, but it is sufficient to bring the breather element into the plug-in position before joining the first and second housing halves together. By fixing the housing parts to each other, the breather element is automatically fixed in the plug-in position. When the second housing part bears on the fixing stop, the breather element is fixed in its movement in all directions. The second housing part prevents the breather element from being able to move back out of the plug-in position against the direction in which it was plugged into the plug-in position.

The bearing between the fixing stop and the second housing part can be subject to play. A small joint can thus remain between the fixing stop and the second housing part. However, the joint is so small that the breather element is held securely in the plug-in position. There is also the possibility that there is a compression between the fixing stop and the second housing part. Then the fixing stop bears against the second housing part without play.

The first housing part and the second housing part preferably form a flat dividing line. The first housing part can be a first housing half, while the second housing part represents a second housing half. However, the invention is also intended to include transmissions whose housing is composed of more than two housing parts (for example, the housing can comprise three housing parts).

In one exemplary embodiment, the first duct wall is designed as a tube, which can have a length of 2 to 10 cm. In this case, the tube can be joined by a tubular duct section which is formed in the first housing part. The tube preferably has an outer diameter which corresponds to an inner diameter of the tubular duct section, so that the tube of the separate breather element can be inserted into the tubular duct section.

The breather element can have an axial plug-in stop, so that the position of the tube in the tubular duct section is fixed in the radial direction and in the axial direction. By joining the second housing part to the first housing part, the second housing part then comes into contact with the fixing stop of the separate breather element, so that it is then no longer possible to push the pipe out of the tubular duct section.

The breather element can have a splash guard in order to make it more difficult for oil to enter the vent duct or to prevent it altogether. In one exemplary embodiment, the splash guard is essentially designed as a segment of a cylindrical lateral surface which is arranged coaxially to the tube. The segment of the cylindrical lateral surface can extend in the circumferential direction in an angular range of 90 to 240°, preferably between 130 and 200°. In the plug-in position of the breather element, the segment is preferably arranged between the tube and rotating components in the transmission in order to prevent oil from getting into the tube which is thrown up by the components.

The lateral surface and the first duct section can be joined together by a radial web. In this case, the radial web can be designed as the axial plug-in stop of the breather element described above. If the breather element is inserted into the first housing half, the tube then being pushed into the tubular duct section, the radial web prevents the breather element from being axially displaced beyond the intended plug-in position.

In an alternative exemplary embodiment, the first duct wall projects into a blind bore-shaped recess of the first housing part, wherein it divides the recess into two duct sections which are joined together at a bottom of the recess. By plugging the breather element with the duct wall into the recess, a vent duct with a U-shaped duct area can be created. Such a duct guide effectively separates oil and air by the labyrinth effect of the U-shaped duct area.

The breather element can have a cover, from which the first duct wall preferably extends perpendicularly. In a preferred embodiment, the fixing system is arranged on the cover. In this case, the plug-in position and the breather element can be designed in such a way that the cover extends essentially parallel to the dividing line of the opposing housing parts.

The breather element can be an injection molded part, preferably made of plastic. A base body of the breather element can be made of a first material. The fixing stop may comprise a second material that is softer than the first material. Since, when joining the housing parts, between the second housing part and the fixing stop, in addition to the contact with play, a braced contact is also possible in principle, any manufacturing tolerances can be compensated for by the softer material. This ensures that the breather element on the one hand does not wobble back and forth in the plug-in position, which could lead to undesirable noises during operation of the transmission, and on the other hand the breather element is not exposed to excessive stresses if, due to the tolerances, there is a particularly tight press fit.

BRIEF DESCRIPTION OF THE DRAWINGS

The invention is explained in more detail using the exemplary embodiments shown in the drawing.

DETAILED DESCRIPTION

Figure 1:
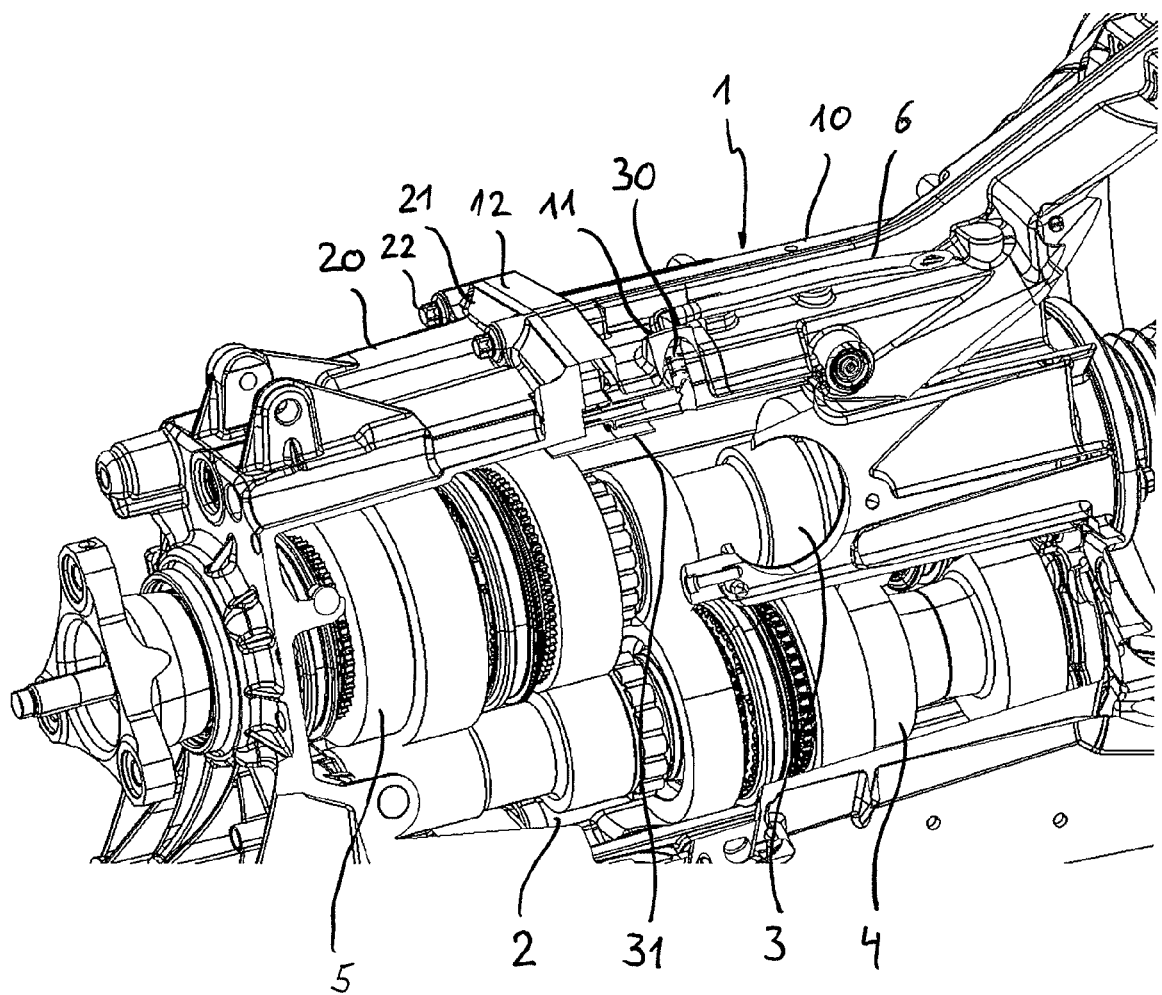
FIG. 1 shows a first exemplary embodiment of a motor vehicle transmission in a perspective sectional view.

FIG. 1 shows a transmission for a motor vehicle in a perspective sectional view. The transmission has a housing 1, which comprises a first housing part 10 and a second housing part 20. The housing 1 encloses an interior 2 of the transmission in which an input shaft 3, a countershaft 4 and an output shaft 5 are rotatably mounted. The input shaft 3 and the output shaft 5 are arranged coaxially to one another, so that the transmission shown in FIG. 1 is an inline transmission.

In the interior 2 there is a (transmission) oil which is thrown around in the interior 2 by the rotation of the shafts 3, 4, 5 and the gearwheels arranged thereon. If there is a temperature increase in the interior 2 of the transmission, the air in the interior 2 expands, which leads to an increase in pressure in the transmission. In order to be able to reduce this increase in pressure, the transmission has a vent duct 30 which is formed in the second housing part 20. FIG. 1 shows a vent hose 6 which is connected to the vent duct 30 at a vent opening 11 of the first housing part.

The first housing part 10 has a circumferential flange 12 which, in the assembled state of the transmission, bears against a circumferential flange 21 of the second housing part 20, possibly with the interposition of a seal. The housing parts 10, 20 are fixed to one another by means of screws 22 which engage in threaded bores (covered in the illustration in FIG. 1) of the first housing part 10.

Figure 2:
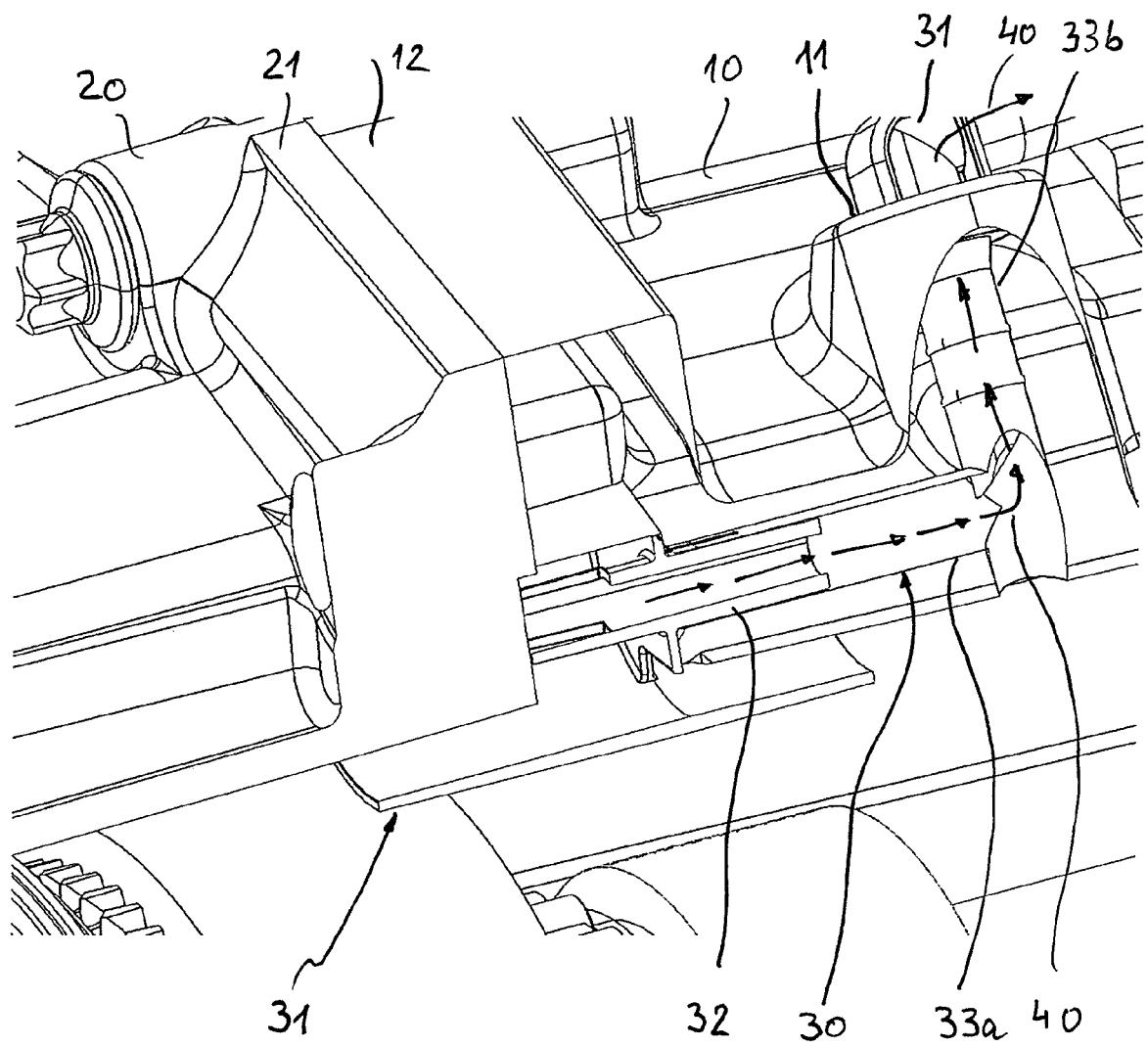
FIG. 2 shows an enlarged section of the sectional view of FIG. 1.

FIG. 2 shows an enlarged section from FIG. 1. A separate breather element 31 can be seen, which is shown in isolation in FIG. 3. The separate breather element 31 forms a first duct wall of the vent duct 30, which is designed as a tube 32 in the exemplary embodiment in FIGS. 1 to 3. The tube 32 is partially inserted in a tubular duct section 33a of the vent duct 30. The tubular duct section 33a opens into an end section 33b which is perpendicular to the tubular duct section 33 and which extends as far as the vent opening 11 to which the vent hose 6 is connected.

Figure 3:
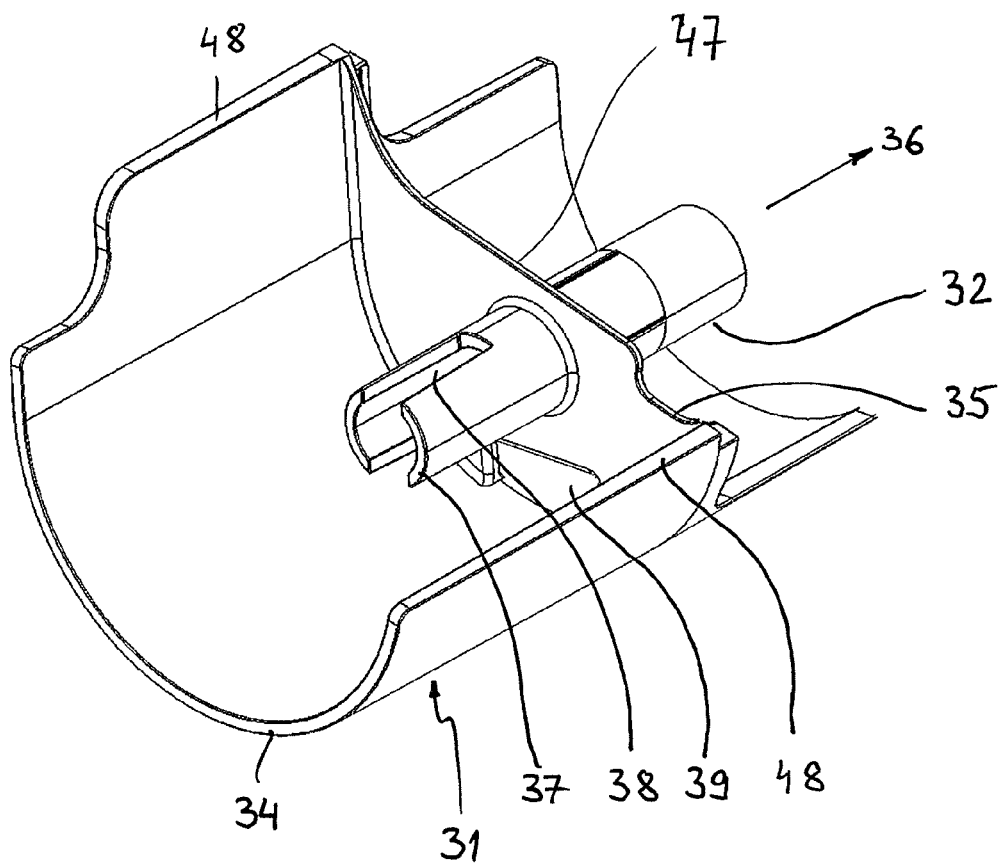
FIG. 3 shows a separate breather element in a first configuration.

As can be seen in particular from FIG. 3, the breather element 31 has a splash guard 34 in addition to the tube 32, which is designed as a segment of a cylindrical lateral surface. The splash guard 34 or the segment 34 is arranged coaxially to the tube 32. The segment extends in the circumferential direction in an angular range of approx. 180°.

A radial web 35 joins the tube 32 and the splash guard 34. It can be seen from FIG. 2 that the radial web 35 bears against an end face of the tubular duct section 33a. The radial web 35 thus serves as an axial plug-in stop for the breather element 31. In the plug-in position shown in FIG. 2, the breather element 31 is fixed in the radial direction by an outer surface of the tube 32 bearing against an inner surface of the tubular duct section 33a. In a first axial direction 36, in which the breather element 31 is pushed into the plug-in position during assembly, the breather element 31 is fixed by the radial web 35. In the assembled state, the second housing part 20 bears, possibly with a certain amount of play, against a fixing stop 37 of the breather element 31. The fixing stop 37 coincides here with an end face of the tube 32. In this case, it is the end face of the tube 32 which faces away from the tubular duct section 33a.

In the vicinity of the fixing stop 37, the tube 32 has two longitudinal slots 38 through which air can get into the tube 32 from the interior 2 of the transmission. The splash guard 34 prevents oil 3 thrown up by the rotation of the shafts 3, 4, 5 located in the interior 2 from entering the tube 32. An opening 39 in the radial web 35 serves to allow the air to reach the longitudinal slots 38 of the tube 32 from all parts of the interior without great resistance. The arrows 40 in FIG. 2 illustrate the flow of the air through the vent duct 30. The radial web 35 has a contact edge 47 which is formed here in a straight line and which, in the plugged-in position of the breather element 31, interacts with a correspondingly shaped contact surface of the first housing part 10 in order to fix the rotational position and thus to prevent rotation. Another or additional anti-rotation protection consists in bringing lateral end edges 48 of the splash guard 34 into contact with corresponding opposing surfaces on the first housing part 10.

Figure 4:
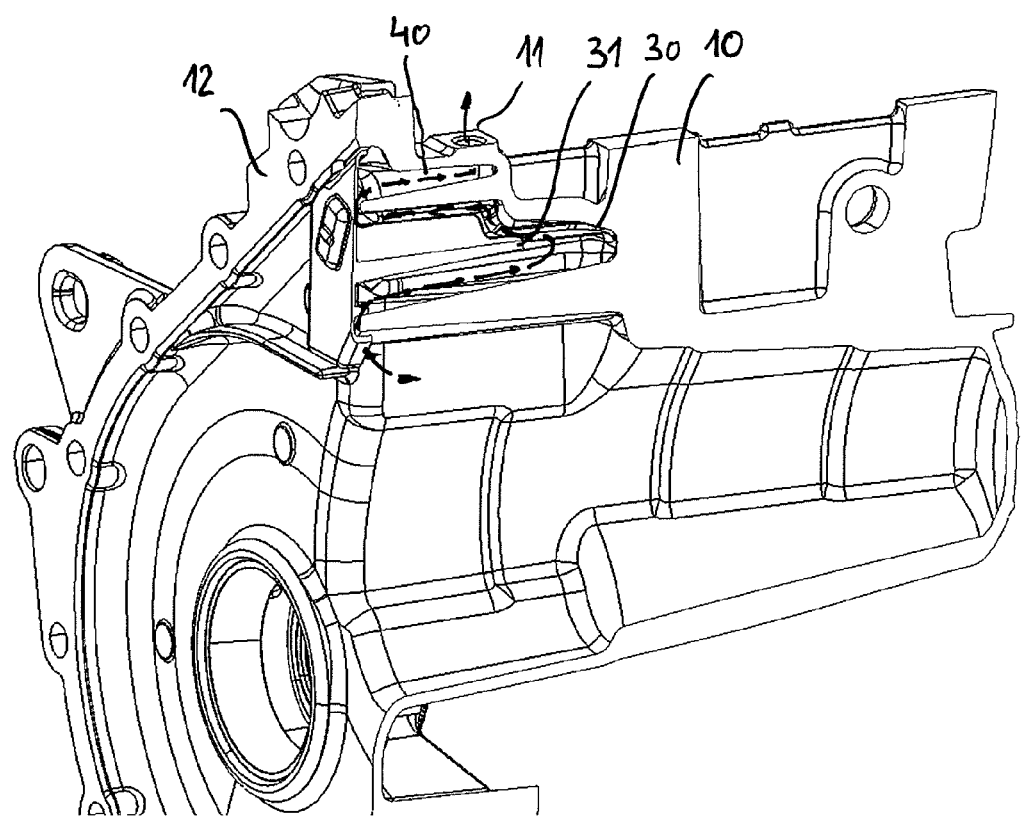
FIG. 4 shows a second exemplary embodiment of a motor vehicle transmission, only a first housing part being shown here in a perspective sectional view.
Figure 6:
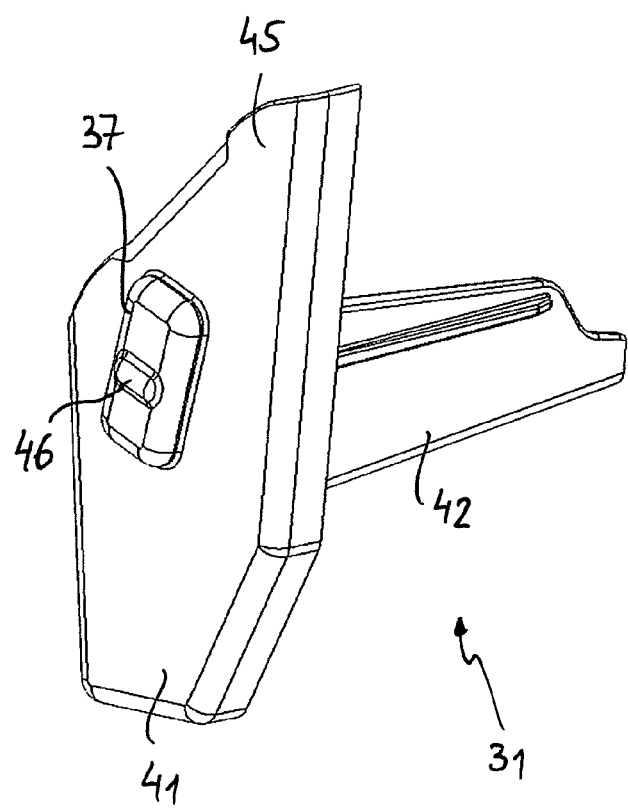
FIG. 6 shows a separate breather element in a second configuration.
Figure 7:
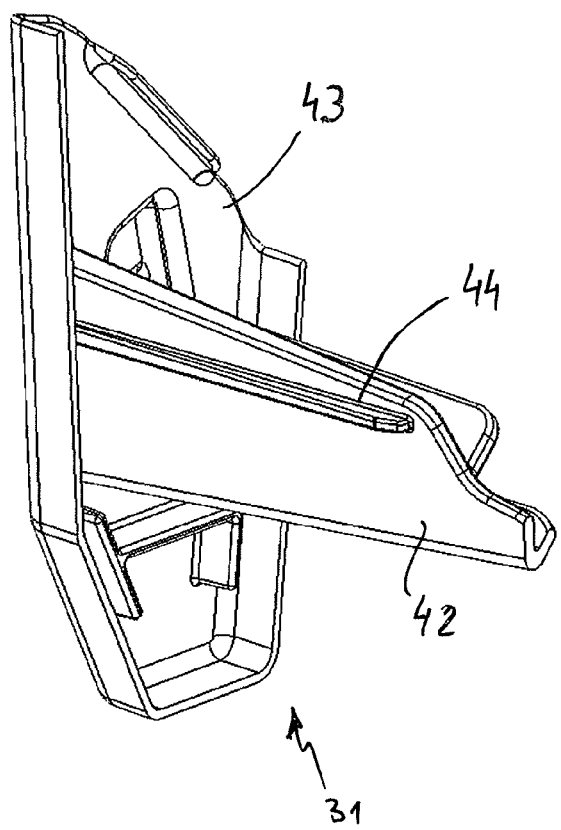
FIG. 7 shows the separate breather element in another perspective view.

FIG. 4 shows a second exemplary embodiment of the transmission according to the invention, only the first housing part 10 being shown here in a perspective sectional view. Components or features in FIG. 4 that are similar or identical to components or features of FIGS. 1 to 3 are provided with the same reference numerals. The same applies to FIGS. 5 to 7 showing sections or details of FIG. 4.

Figure 5:
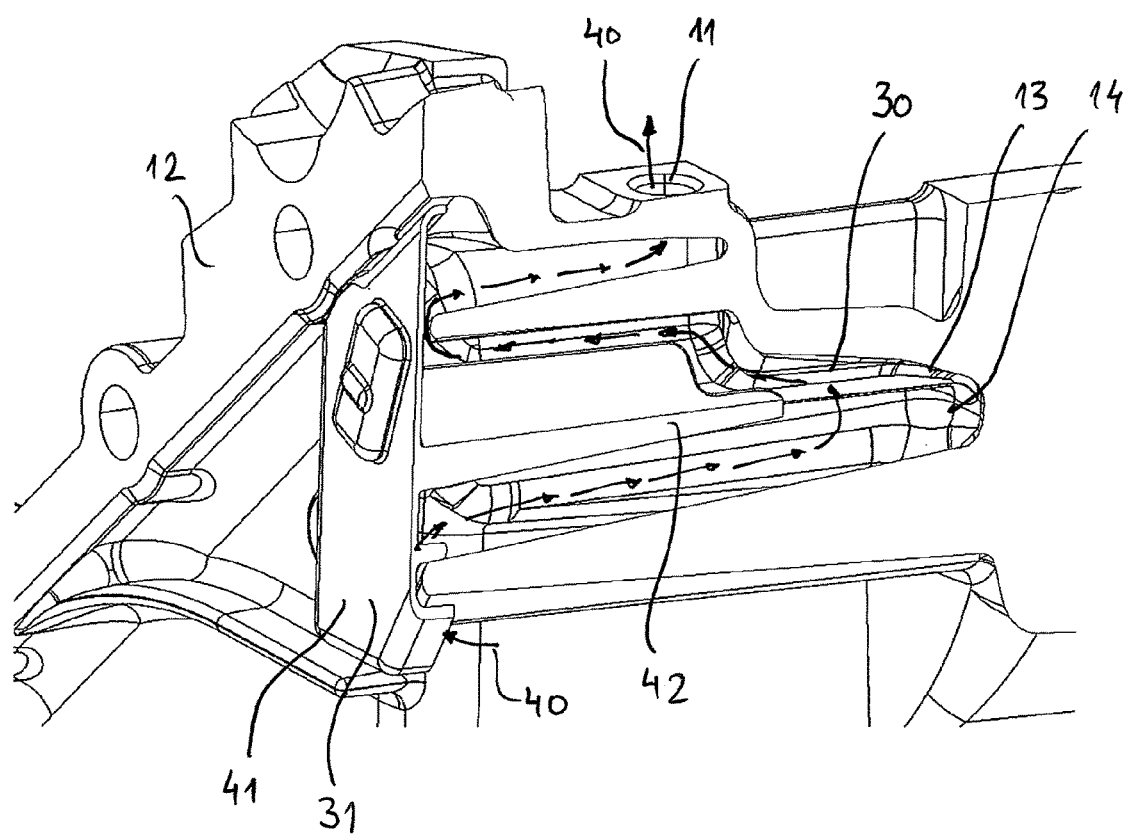
FIG. 5 shows an enlarged section of the sectional view of FIG. 4.

FIGS. 4 and 5 clearly show the vent opening 11 and the flange 12, which lies in a plane and thus forms a flat dividing line with the second housing part 20, not shown here. The breather element used here is also designated 31, although its construction differs from the breather element 31 of the exemplary embodiment in FIGS. 1 to 3. The flow of the air flowing through the vent duct 30 can be traced by the arrows 40 (see in particular FIG. 5, which represents an enlarged section of FIG. 4).

The breather element 31 has a cover 41, from which the first duct wall in the form of a sword 42 extends approximately perpendicularly. In this case, the sword 42 projects into a blind bore-shaped recess 13 in the first housing part 10. The projection of the sword 42 into the recess 13 creates two duct sections which are joined together on a bottom 14 of the recess 13. This creates a U-shaped duct area so that the labyrinthine path of the air (see arrows 40) creates a long duct section.

A lower side 43 of the cover 41 (see FIG. 7) serves as a plug-in system, so that the plug-in position shown in FIG. 5 is defined in the plug-in direction. The sword 42, which has an approximately L-shaped cross section, comprises at least one support or contact web 44, with which the breather element 31 comes into contact with the recess 13 and seals the duct sections of the U-shaped duct region from one another. The contact web 44 defines the plug-in position transverse to the plug-in direction.

The fixing stop 37, which has a small elevation 46, is arranged on an upper side 45 of the cover 41. The elevation 46 is formed from a material that is softer than the material used to form the remaining parts of the breather element 31. In the assembled state of the transmission, the second housing part 20 presses against the elevation 46 in order to fix the breather element 31 in its plug-in position. It is not necessary in this case to fix the breather element to one of the two housing parts in a separate assembly step by means of additional fixing means such as screws or the like.

It should also be pointed out that the fixing stop 37 is located at a location on the flat cover 41 that is not reinforced by reinforcing structures on the lower side 43 (see FIG. 7). Thus, the cover 41 has a certain flexibility at the location of the fixing stop 37, which increases the function of the softer material of the elevation 46 or can take it over entirely. In this sense, the radial web 35 of the other exemplary embodiment (see FIGS. 1 to 3) could also be designed by suitable measures such as the provision of weakened areas in such a way that there is a certain flexibility in the axial direction, that is to say in the plug-in direction, so that there are no excessive stresses in the axial direction when the second housing part is installed.

LIST OF REFERENCE NUMERALS

1: housing
2: interior
3: input shaft
4: countershaft
5: output shaft
6: vent hose
10: first housing part
11: vent opening
12: flange
13: recess
14: bottom
20: second housing part
21: flange
22: screw
30: vent duct
31: breather element
32: tube
33*a*: duct section
33*b*: end section
34: splash guard
35: radial web
36: plug-in direction
37: fixing stop
38: longitudinal slot
39: opening
40: arrow (air flow)
41: cover
42: sword
43: lower side
44: contact web
45: upper side
46: elevation
47: contact edge
48: end edge

The invention claimed is:

1. A transmission for a motor vehicle, comprising:
a housing, which has a first housing part and a second housing part, wherein, in an assembled state of the transmission, the first housing part and the second housing part are joined together,
a vent duct through which air can escape from the transmission, and
a separate breather element, which extends into the first housing part and forms at least one first duct wall of the vent duct, wherein the breather element is located in a plug-in position in the first housing part and has a fixing stop, against which the second housing part bears in the assembled state of the transmission and thus securely fixes the breather element in the plug-in position,
wherein the breather element has a splash guard in order to make it more difficult for oil to enter the vent duct,
wherein the splash guard is designed as a segment of a cylindrical lateral surface which is arranged coaxially to the at least one first duct wall, and
wherein the cylindrical lateral surface and the at least one first duct wall are joined by a radial web.

2. The transmission according to claim 1, wherein the at least one first duct wall is designed as a tube.

3. The transmission according to claim 2, wherein said tube is followed by a tubular duct section which is formed in the first housing part.

4. A transmission for a motor vehicle, comprising:
a housing, which has a first housing part and a second housing part, wherein, in an assembled state of the transmission, the first housing part and the second housing part are joined together,
a vent duct through which air can escape from the transmission, and
a separate breather element, which extends into the first housing part and forms at least one first duct wall of the vent duct, wherein the breather element is located in a plug-in position in the first housing part and has a fixing stop, against which the second housing part bears in the assembled state of the transmission and thus securely fixes the breather element in the plug-in position,
wherein the at least one first duct wall projects into a blind bore-shaped recess of the first housing part, wherein it creates at least two duct sections in said recess which are joined together at a bottom of said recess.

5. The transmission according to claim 4, wherein the breather element has a cover from which the at least one first duct wall extends.

6. The transmission according to claim 5, wherein the fixing stop is arranged on the cover.

7. The transmission according claim 4, wherein the fixing stop comprises a material which is softer than the first material used to form remaining parts of the breather element.

\* \* \* \* \*